United States Patent [19]

Hammacher et al.

[11] Patent Number: 5,309,697
[45] Date of Patent: May 10, 1994

[54] CHEWING GUM PACKAGING MACHINE

[75] Inventors: Heinz P. Hammacher, Bamberg; Herbert Backes, Oberasbach, both of Fed. Rep. of Germany

[73] Assignee: PVT Piepenbrock Verpackungstechnik GmbH, Osnabruck, Fed. Rep. of Germany

[21] Appl. No.: 7,731

[22] Filed: Jan. 22, 1993

[30] Foreign Application Priority Data

Jan. 28, 1992 [DE] Fed. Rep. of Germany ....... 4202308

[51] Int. Cl.⁵ ........................ B65B 11/08; B65B 11/18; B65B 13/00
[52] U.S. Cl. ........................................ 53/443; 53/533; 53/233
[58] Field of Search .................. 53/450, 443, 533, 233, 53/228, 249, 251

[56] References Cited

U.S. PATENT DOCUMENTS

| | | | |
|---|---|---|---|
| 1,121,155 | 12/1914 | Armstrong | 53/533 |
| 2,535,859 | 12/1950 | McPherson | 198/32 |
| 3,581,457 | 6/1971 | Gerlach et al. | 53/450 |
| 4,870,802 | 10/1989 | Cerf | 53/450 X |
| 4,955,184 | 9/1990 | Francioni | 53/450 X |
| 5,109,650 | 5/1992 | Hogenkamp | 53/443 |

FOREIGN PATENT DOCUMENTS

0152762 12/1981 Fed. Rep. of Germany.

*Primary Examiner*—James F. Coan
*Attorney, Agent, or Firm*—Nixon & Vanderhye

[57] ABSTRACT

A packaging machine for individual flat strip-like articles, in particular chewing gum strips (10), comprises means for cutting (110) and supplying (100), wrapping (300) and grouping (400; 500) of the individual articles. The packaging machine comprises a first fast section through which the articles pass continuously, i.e. substantially without retardations or accelerations. In this machine section the chewing gums are first cut from sheets (20) to strips (10) in a cutting device (110) and thereafter individually wrapped, a turning drum (340) possibly being employed. Subsequently, they are combined to groups in a grouping means (400; 500). In this second machine section the chewing gum groups are further conveyed intermittently in cycles with lower speed to a collective packing machine. By exchanging components in the grouping means of the fast machine section the articles can be combined to groups different in number and arrangement.

28 Claims, 8 Drawing Sheets

CHEWING GUM PACKAGING MACHINE

The invention relates to a method and an apparatus for supplying, wrapping and grouping individual flat strip-like articles, in particular chewing gum strips.

In contrast to known packaging machines, which have an intermittent cyclic mode of operation with standstill times between the individual cycles, in the packaging machine according to the invention a continuous passage of the individual articles is provided. This solution has the advantage that the inertial forces acting on the articles and the machine components during the retardations or accelerations inherent in the intermittent mode of operation are substantially avoided.

For the same packaging performance, an intermittent cyclic machine of known design must transport the articles to be packaged at a substantially higher speed than a continuously running machine. If for example the individual working cycles take up half the total working time, whilst the conveying members remain stationary in the remaining half of the working time, the average speed of a conveyed article during a working cycle must be twice as high as the conveying speed of the packaging machine according to the invention with continuous operation. Since, however, additional accelerations and retardations are necessary at the start and end of each working cycle, the highest speed of the individual article and the corresponding apparatus components is considerably higher in the working cycle. A substantial disadvantage of the intermittent mode of operation is moreover the operationally inherent increased wear of all the parts and the danger of breakage of the articles to be conveyed.

The packaging machine according to the invention comprises a first fastly running section through which the individual articles pass continuously. In this machine section the articles, in particular the chewing gums, are first cut from sheets to strips and then transferred via a supply means to a wrapping conveyer in which the individual strips are wrapped in wrapping material. This wrapping region is followed by a second slowly running section of the packaging machine. Here, the articles are transferred to a grouping means in which they are combined to groups and further conveyed in intermittent cycles to a collective packaging machine. By exchanging components at the transition from the wrapping region to the grouping means groups of a different number and arrangement of the articles can be made.

With the known chewing gum packaging machines, hitherto maximum outputs of about 900 to 1200 packaged strips per minute were achieved. With the machine according to the invention an output of about 2500 strips per minute can be achieved. This output is however only achievable if the processes employed are not intermittent but run continuously or are at least quasi-cyclic. With the packaging machine according to the invention the first fast section has this high performance whilst in the second slow machine section in the grouping of the articles a reduction takes place in the ratio of the number of strips per package. Thus, for example, with a grouping of eight strips per package the result is about 300 packages per minute and with 18 strips per package about 140 packages per minute. The output of the packaging machine with continuous running is controllable variably.

Further details and advantages of the invention will be apparent from the following description of examples of embodiment with the aid of the drawings.

The functioning principle of the packaging machine will be described hereinafter by way of example with reference to chewing gum strips; it applies however generally to flat strip-like articles.

Figure 1:
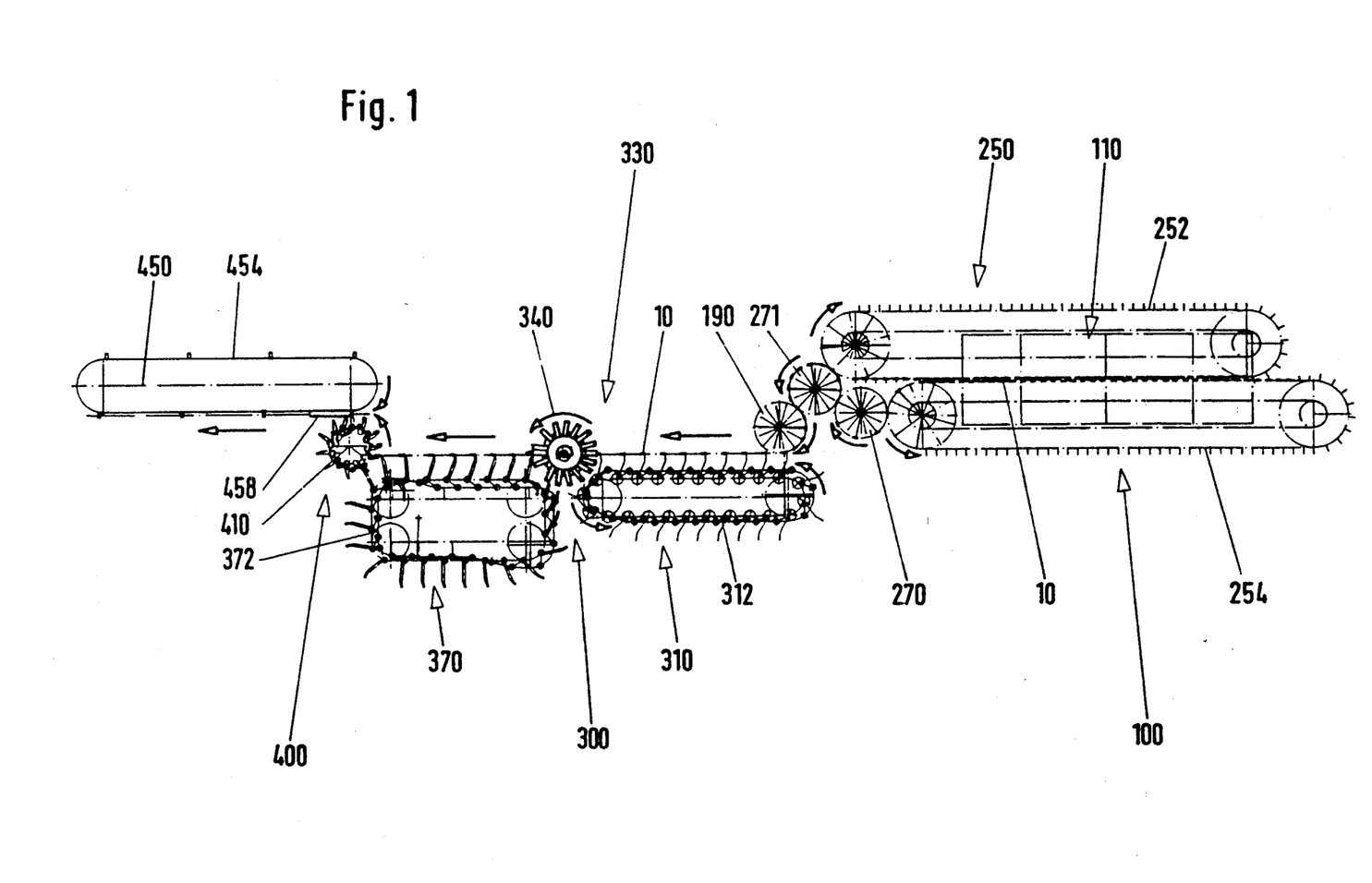
FIG. 1 is a schematic side elevation of the overall packaging machine for strip-like articles which pass through the apparatus from right to left.

FIG. 1 shows an overall view of the packaging machine through which the chewing gum strips pass from right to left. The individual chewing gums are made available in the supply region 100 and transferred to the wrapping region 300 where they are individually wrapped. In different number and arrangement the individual chewing gums are finally transferred to a grouping means 400 where they are combined to groups and further conveyed for packing. This overall view shows in each case only one example of embodiment of the supply region and the grouping means.

Figure 2A:
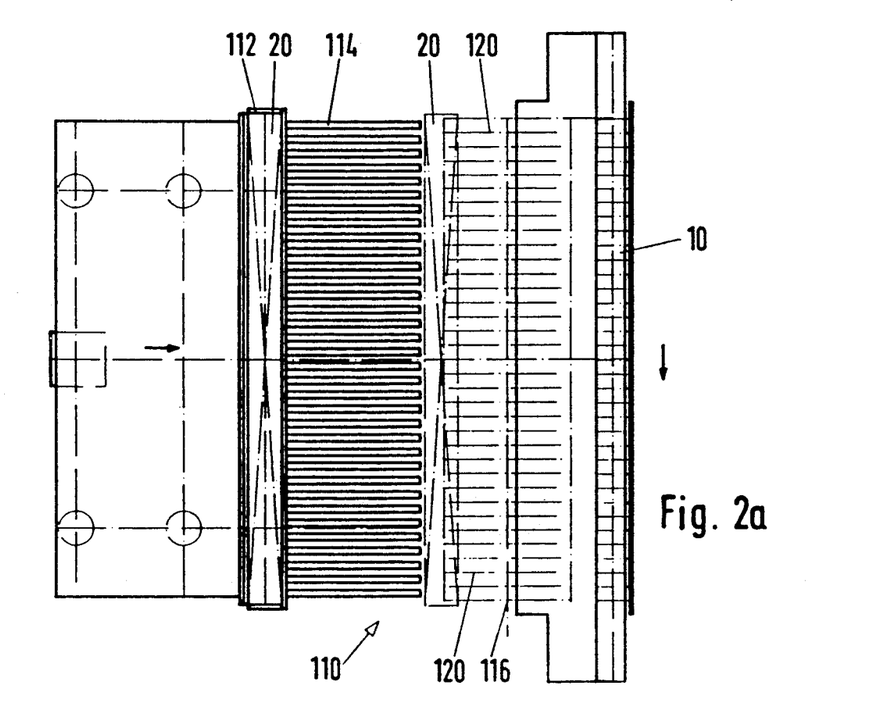
FIG. 2a is a plan view of a strip cutting device.
Figure 2B:
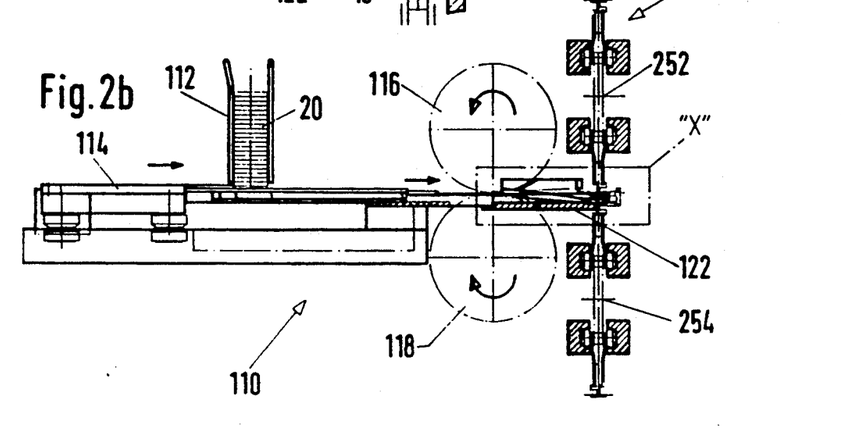
FIG. 2b is a schematic side elevation of the strip cutting device of FIG. 2a, partially in section.
Figure 2C:
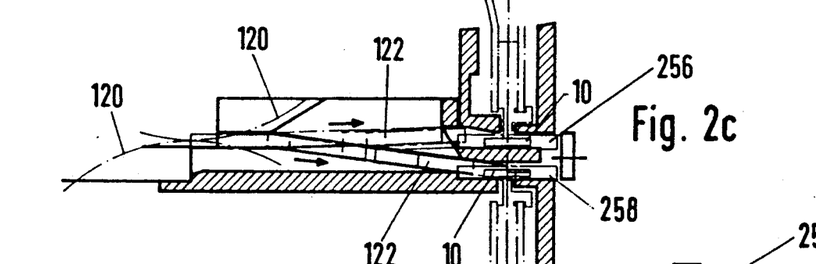
FIG. 2c is a detail illustration of the detail X of FIG. 2b.

In the supply region 100 the individual chewing gums are first prepared by means of a strip cutting device 110 (FIGS. 2a, b, c). In known packaging machines the chewing gums are not cut from sheets into individual strips. On the contrary, the chewing gum sheets are only pregrooved therein, thereby forming predetermined breakage points. The chewing gums are then separated from the chewing gum sheet by a breaker shaft (cf. DE-AS 2,433,547). However, this method leads in high-performance machines to frequent disturbances at the breaker shaft. Therefore, according to the invention the chewing gum sheets are already cut to individual chewing gum strips at the entrance to the packaging machine.

The strip cutting device 110 comprises a magazine 112 in which chewing gum sheets 20 are stacked flat one above the other. A pusher 114 pushes the lowermost chewing gum sheet out of the magazine between two superimposed cutter cylinders 116, 118. The cutter cylinders consist of individual circular cutters 120 which are arranged in such a manner that on rotation of the cutter cylinders 116, 118 they pull the chewing gum sheet 20 between the two cutter cylinders and thereby cut said sheet into individual chewing gum strips 10 (FIGS. 2a and b).

In the supply region 100 of the chewing gum packaging machine, adjacent the strip cutting device 110 conveying members or supply means 150 and 250 are provided comprising conveying paths for transporting the individual chewing gum strips 10 in mutually spaced relationship. The supply means 150 and 250 consist of two chain transport systems 152, 154 and 252, 254 respectively which are arranged with respect to each other in such a manner that they form an upper conveying path 156 and 256 and a lower conveying path 158 and 258, said two conveying paths being arranged parallel to each other. From the strip cutting device 110 the individual adjacent chewing gum strips 10 are supplied via wedge-shaped distributing guide surface 122 behind the cutter cylinders 116, 118 to the upper and lower conveyor path of the chain transport system respectively so that the chewing gums on each conveying path are transported spaced from each other (FIGS. 2b and c).

The supply means can be implemented in two different variants: In the first example of embodiment (FIG. 3) the supply means 150 is formed by two parallel and adjacently arranged chain transport systems 152, 154 which both have the same circulating direction. The two chain transport systems comprise entraining members 160 for the chewing gum strips which are configured and arranged in such a manner that to convey the chewing gums they engage behind the latter and transport them on the parallel extending conveyor paths 156, 158 in the same conveying direction. At the end of the two conveying paths 156, 158 of the two chain transport systems 152, 154 a device is provided for bringing the individual chewing gums from the two conveying paths together onto a single conveying path 180 in the form of switch points 170. These switch points 170 are followed by a transfer conveyor 190 by which the chewing gum strips on the united conveying path 180 are accelerated and further held spaced apart. The transfer conveyor 190 is a transfer wheel having receiving pockets 192 for the chewing gums. At the peripheral portion of the transfer conveyor over which the conveying path 180 extends guides 194 are provided on which the chewing gum strips are pushed by means of the receiving pockets 192. These and other guides on which the chewing gum strips are displaced, as well as the parts of the packaging machine coming into contact with the chewing gums, consist of Teflon, which involves low friction, and/or ceramic, which has a high hardness; alternatively, the machine parts can be correspondingly coated.

Figure 3:
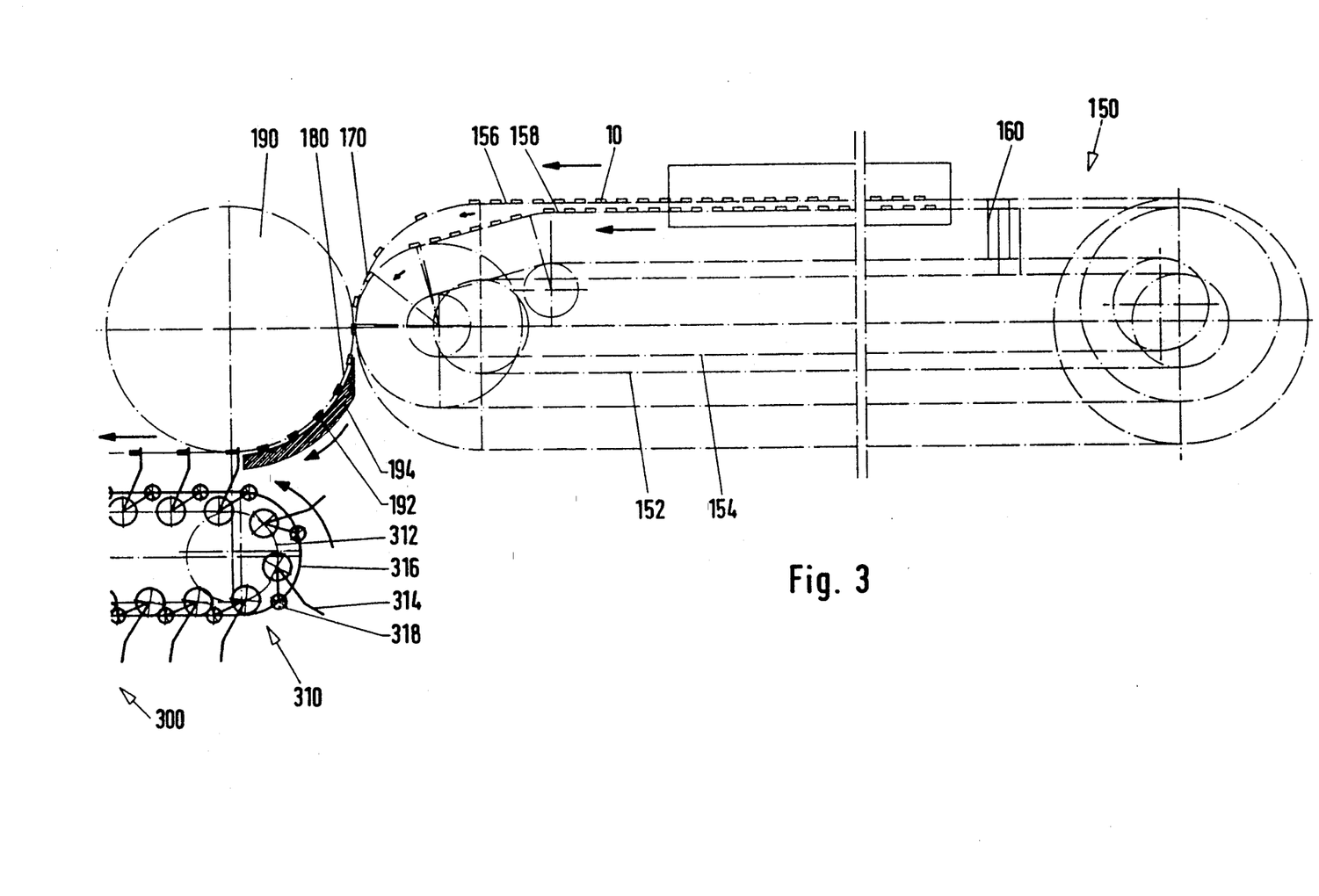
FIG. 3 is a schematic cross-section of a first example of embodiment of a supply means for the strip-like articles.

The switch points 170 may be constructionally difficult to implement and difficultly accessible for maintenance or cleaning of the apparatus. In addition, with this variant of the supply means 150 for conveying the chewing gums 10 the entraining members 160 must extend laterally upwardly a great distance from the chain transport systems 152, 154 and transversely up to engagement into the conveying paths 156, 158 and consequently the guiding of the chewing gums might possibly not always be accurately enough.

For this reason, a second variant of the supply means 250 is a possible alternative (FIG. 4): The two conveying members consist of a first upper chain transport system 252 and a second chain transport system 254 arranged parallel therebelow. The two chain transport systems again comprise entraining members 260 which engage behind the chewing gum strips 10 and push the latter on the upper and lower conveying path 256 and 258 respectively. The two chain transport systems 252 and 254 have opposite circulating directions but the same conveying direction along the conveying paths 256 and 258. At the end of the conveying paths of the chain transport systems a device is again provided for bringing together the chewing gums from the two conveying paths 256, 258 onto a single conveying path 280. This device is again formed by two intermediate wheels 270 and 271 having receiving pockets 272 for the chewing gums. The conveying path 258 of the lower chain transport system 254 extends over a portion of the periphery of the first intermediate wheel 270 up to the periphery of the second intermediate wheel 271. Only the second intermediate wheel 271 receives in addition to the chewing gums of the lower conveying path 258 also the chewing gums of the upper conveying path 256 so that at said second intermediate wheel 271 the two conveying paths are brought together to form a single conveying path 280. The united conveying path 280 extends over a portion of the periphery of the second intermediate wheel 271 and finally merges into a transfer conveyor 190 on which the chewing gums are further maintained in spaced relationship. The transfer conveyor 190 is again a transfer wheel with receiving pockets 192 for the chewing gums. At the peripheral regions of the intermediate wheels 270, 271 and the transfer wheel 190 over which the conveying paths 258 and 280 extend, guides 274 and 194 are provided on which the chewing gums are displaced by means of the receiving pockets 272 and 192 respectively.

Figure 4:
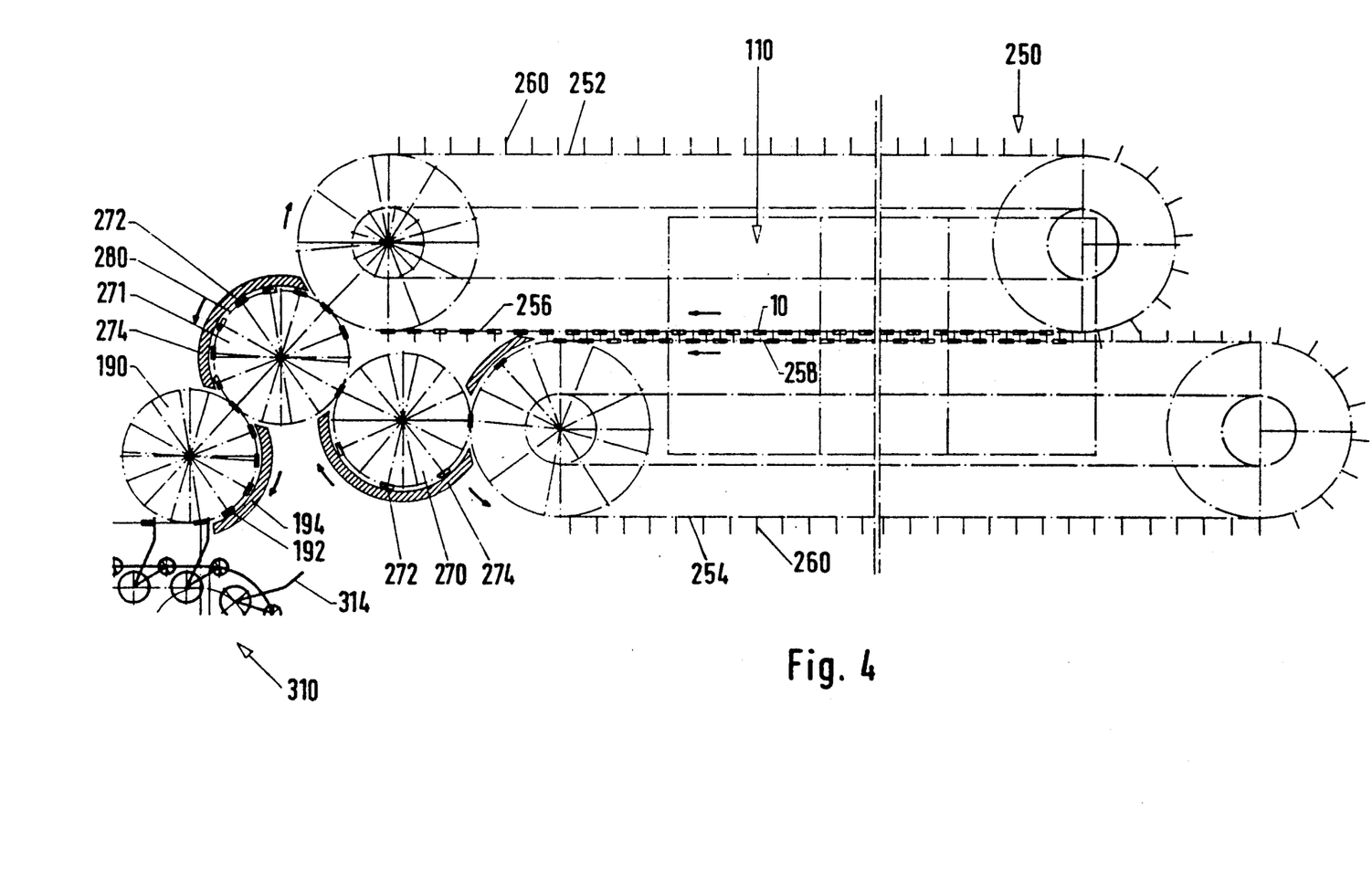
FIG. 4 is a schematic cross-section of a second example of embodiment of a supply means for the strip-like articles.

The second variant 250 of the supply means is advantageous compared with the first variant 150 in so far as on the chain transport systems 252 and 254 only very short entraining members 260 are necessary which engage on the one hand from above and on the other from below on the chewing gums, thereby permitting a more exact guiding. In addition, the upper chain transport system 252 may be removed as a whole, thereby improving access to the apparatus for maintenance and cleaning.

Figure 5:
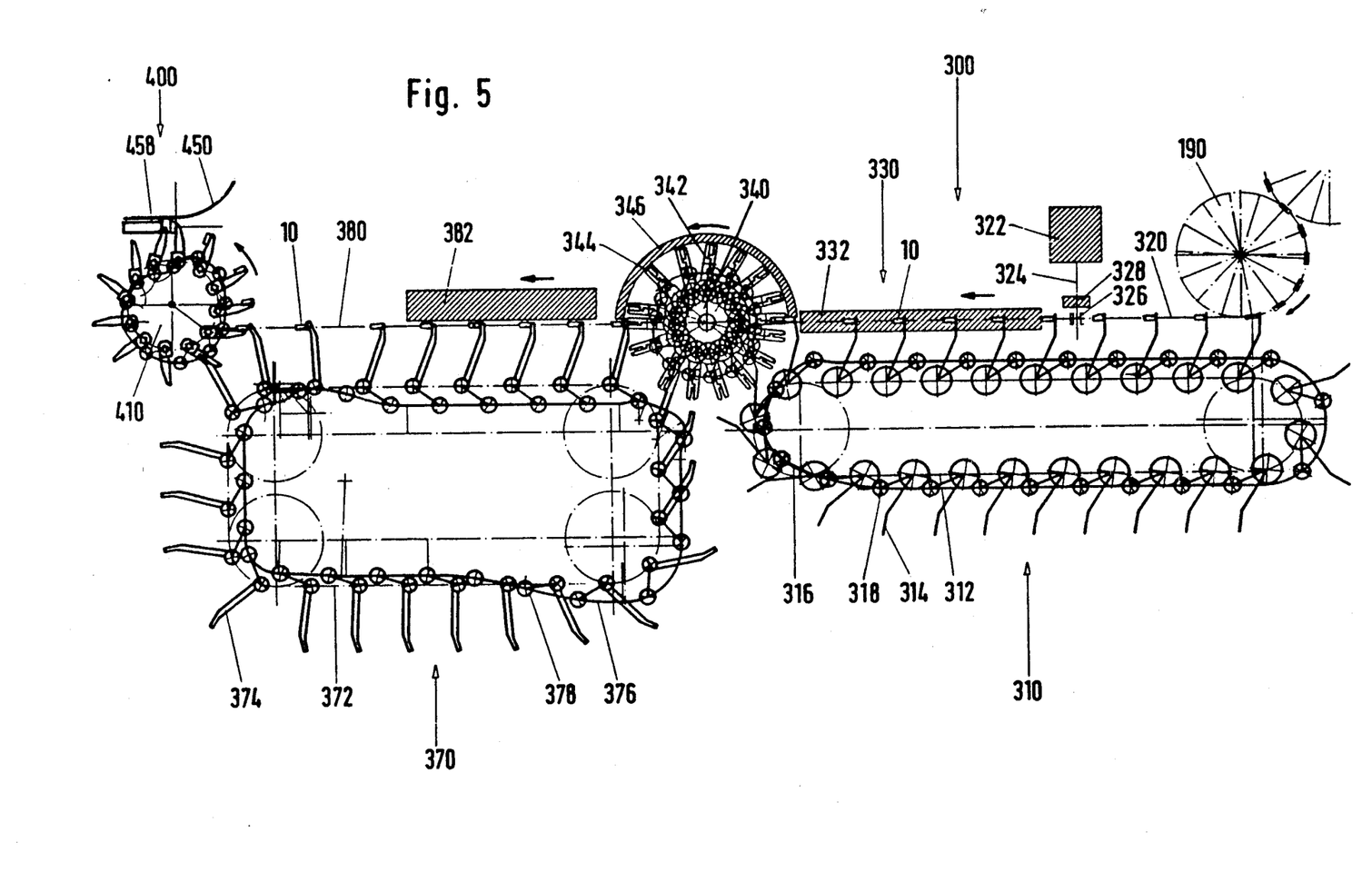
FIG. 5 is a schematic cross-section through the wrapping region of the packaging machine.

The supply region 100 of the packaging machine is followed by the wrapping region 300 (FIG. 5). The connection between the two regions is established by the transfer conveyor 190 which is provided in both variants 150 and 250 of the supply means. The transfer conveyor 190 is followed by a wrapping conveyor 310 on which the chewing gum strips 10 are possibly further accelerated and on which they are individually wrapped with constant mutual spacings. The wrapping conveyor 310 is again formed by a chain transport system 310 on which individual entraining members 310 are pivotally mounted. To control the pivot movement of the entraining members 314, in the chain transport system 312 curved paths 316 are provided on which the entraining members engage by means of rollers 318. This control makes the entraining members 314 pivotal in the conveying direction in such a manner that at the start of the conveying path 320 of the continuously circulating chain transport 312 they pivot into the conveying path 320. In doing so they engage into the transfer wheel 190 and continuously receive the individual chewing gums from said wheel by engaging behind said gums. The entraining members 314 then further push the chewing gums along the conveying path 320 of the wrapping conveyor 310. To vary the control of the pivot movement of the entraining members 314 the form of the curved paths 316 may be varied by longitudinally displacing the curve in the conveying direction and/or changing the steepness of the curves.

On the wrapping conveyor 310 the flatly lying transported chewing gum strips 10 are individually wrapped with constant mutual spacings. For this purpose, a supply means 322 for a wrapping material 324 for the individual chewing gums 10 and a following folding section 330 is provided. By known means the wrapping material 324 is supplied from above into the conveying path 320, passing through a cutout 326 in the conveying path. The wrapping material strip is wider transversely of the conveying direction than the length of the flatly lying chewing gum strips so that it projects laterally at both ends of the chewing gum strip. Due to the continuous transport of the chewing gums each individual chewing gum is pushed by a respective entraining member 314 up to the wrapping material 324 and further over the cutout 326 in the conveying path 320. The wrapping material 324 thereby comes to lie in U-shaped manner round the chewing gum strip and on further transport of said strip is cut from the wrapping material supply by a cutting device 328. By this cutting, wrapping material projects behind the chewing gum at the top and upwardly and downwardly at both lateral ends of the chewing gum. These lateral wrapping material projections lie only loosely on each other, i.e. are not yet joined together.

On further transport the chewing gum strip with the wrapping material lying therearound in U-shaped manner is introduced into the folding section 330 in which folding members 332 are disposed which fold the lateral wrapping material overlap at both sides through 180° downwardly beneath the chewing gum. The wrapping material is thus applied to the chewing gum here by the lateral fold on both sides so that the wrapping material is now open only rearwardly. By the insertion of the chewing gum into the wrapping material at the supply means 322, the wrapping material is subjected to the first fold. In the folding members 332 the wrapping material undergoes two further foldings.

To complete the wrapping operation, a turning drum 340 (FIGS. 5 and 6) is provided in the folding section 330 behind the folding members 332 at the end of the chain transport system 312 of the wrapping conveyor 310. Said turning drum carries segments 342 mounted pivotally in the peripheral direction. The segments comprise slots for receiving the chewing gums 10, the chewing gum strips being introduced by the entraining members 314 of the chain transport system 312 flatly into the slots 344, possibly with acceleration. Due to the continuous revolving of the drum 340 with constant speed the chewing gum strips are entrained in the slots 344 of the segments 342 round the turning drum and thereby turned through 180° so that on ejection from the drum their previous lower side lies at the top. The folding section 330 extends round the upper peripheral portion of the turning drum 340 on which the latter conveys the chewing gums. By a guide 346 round this peripheral region of the drum the 4th and 5th folding of the wrapping material 324 is effected.

Figure 6:
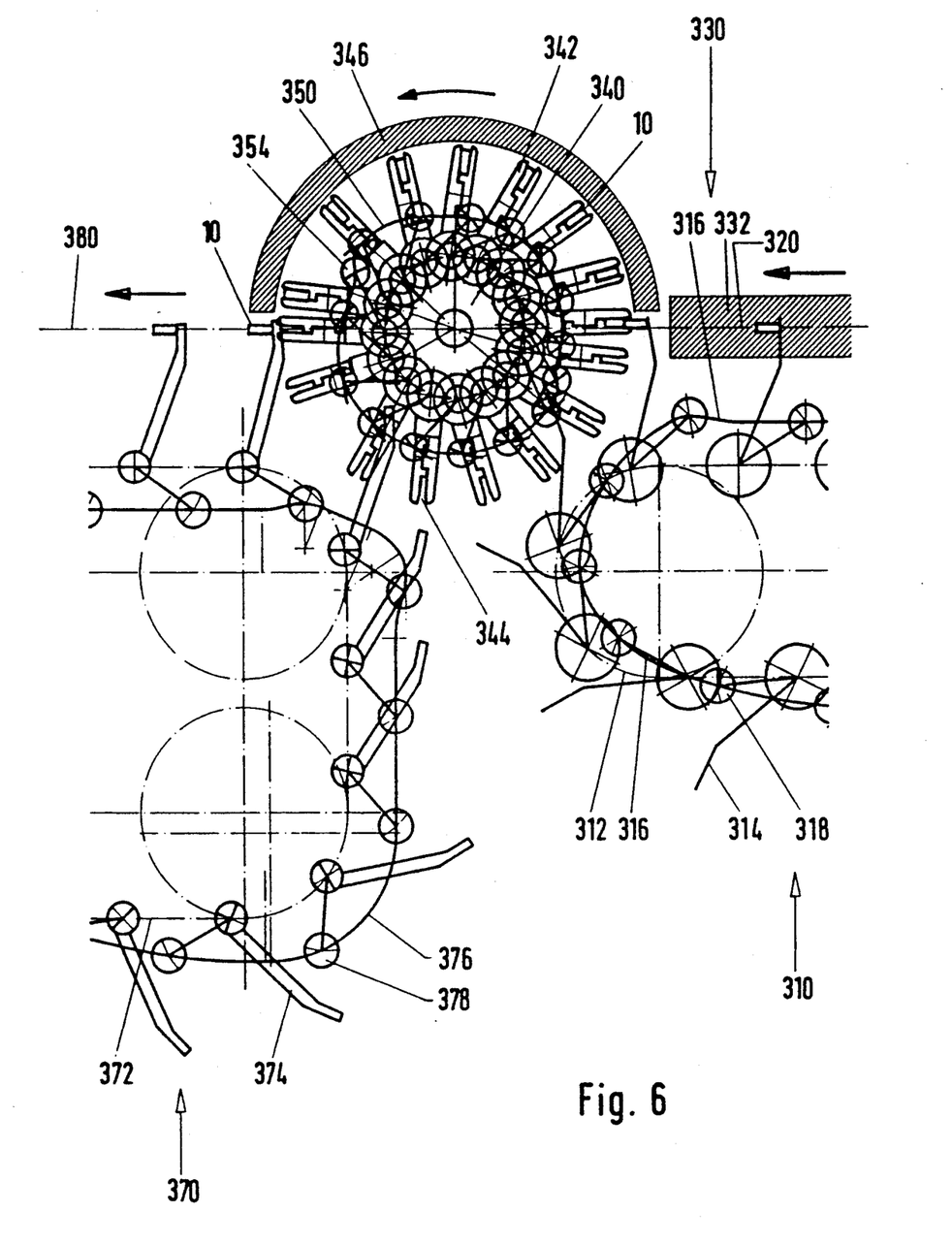
FIG. 6 is a detail view of a turning drum in the wrapping region of the packaging machine in cross-section.

After the pushing of the chewing gum with the wrapping material into a slot 344 of a segment 342 of the turning drum 340, the folding of the rear overlap of the wrapping material is prepared laterally by two insert fingers, which are not illustrated. The latter form an inclined edge at the underfold and not a wrapping material portion terminating flush with the strip end, which could easily jump upwardly. This gives a clean folding of the wrapping material 324 without the latter projecting outwardly. By the guide 346, on revolution of the turning drum 340 the wrapping material portion projecting behind the chewing gum strip is folded through 90° (4th fold). On ejection of the chewing gum out of the slot 344 of the segment 342 on the other side of the turning drum 340 the projecting rear wrapping material portion is finally folded through 90° (5th fold) for a last time by means of the guide 346 and thereby applied to what is now the upper side of the chewing gum. Consequently, in the folding section 330 a total of five folding steps are performed.

The pivotability of the segments 342 of the turning drum 340 serves to facilitate the reception of the chewing gums 10 in the turning drum and their ejection therefrom. The control of the pivot movement of the segments is effected during the continuous drum revolution in such a manner that the individual segment 342 has a peripheral velocity substantially equal to zero for receiving and ejecting the chewing gum. The control of the pivot movement is again effected by curved paths 350 in the turning drum 340 on which the segments 342 engage by means of rollers 354. By this control mechanism the segments are moved forwardly before the entrance point with respect to the drum periphery, whereas on entrance they are retarded so that the entrance is possible effectively in a relative position of rest of the segments 342. Whereas the turning drum 340 moves with constant peripheral speed, the segments therefore first run forwards relatively to the drum, then backwards relatively to the drum for their retardation and finally with increased peripheral speed again forwards relatively to the drum to return to the original radial position.

The segments 342 of the turning drum 340 are moreover divided in such a manner that the width of the slot 344 can be increased in V-shaped manner in the peripheral direction of the turning drum to facilitate reception and ejection of a chewing gum strip. After the opening of the slot for receiving a chewing gum the V-form is again closed so that the chewing gum strip is clamped or held between the parallel segment portions so as not to drop out on revolving of the turning drum. The control of the slot width is again by means of curved tracks or paths on which the segments engage by means of rollers. For clarity these curved paths and these rollers are not illustrated in FIGS. 5 and 6.

When the chewing gum is pushed into the turning drum 340 the entraining members 314 of the chain transport system 312 of the wrapping conveyor 310 pivot rearwardly and dip beneath the drum to avoid colliding with the latter. For this purpose the entraining members 314 engage in comb-like manner into the segments 342 of the turning drum. By controlling the pivot movement of the entraining members 314 and the segments 342 by means of said curve and roller guides and by corresponding cooperation of these components, the insertion and positioning of the chewing gum strips in the drum is very exact.

Figure 7:
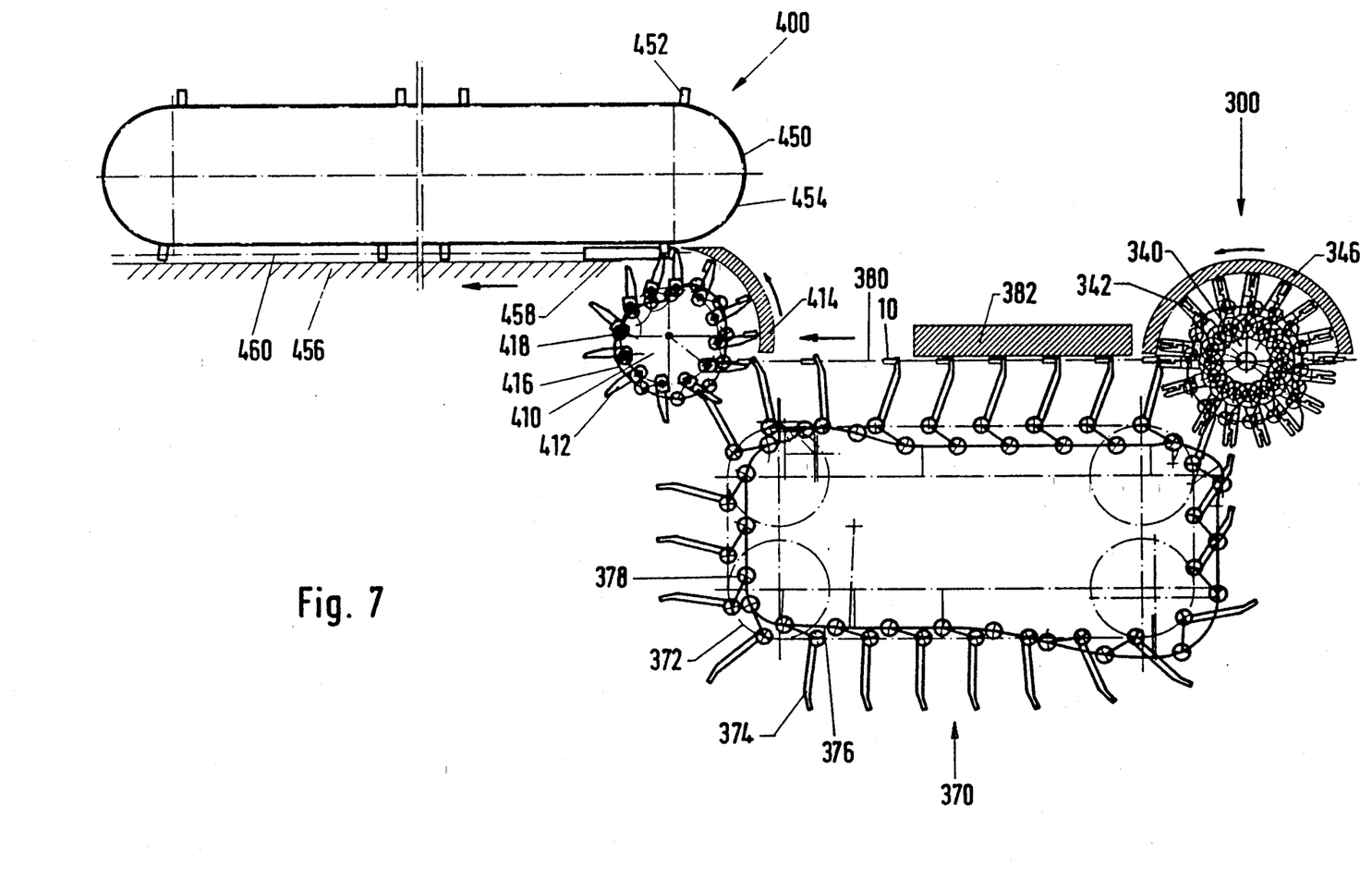
FIG. 7 is a schematic cross-section through the rear part of the wrapping region with a following first example of embodiment of a grouping means for the strip-like articles.

In the wrapping region 300 the folding section 330 is followed by a transfer conveyor 370 (FIGS. 5 and 7). The latter is arranged rectilinearly behind the wrapping conveyor 310 but mechanically separate therefrom so that the two conveyors are individually drivable. Analogously to the wrapping conveyor 310, the transfer conveyor 370 is formed by a chain transport system 372 and comprises individual entraining members 374 which are mounted pivotally thereon. For controlling the pivot movement of the entraining members 374 curved paths 376 are again provided on which the entraining members engage by means of rollers 378. The pivot movement of the entraining members 374 is controlled in such a manner that at the beginning of the conveying path 380 of the chain transport system 372 of the transfer conveyor 370 they pivot into the conveying path 380. They engage in comb-like manner into the segments 342 of the turning drum 340 and guide the chewing gums 10 out of the turning drum 340 by engaging behind the chewing gums. On the conveying path 380 the chewing gums are then further displaced in the conveying direction by the entraining members 374.

When the chewing gums are ejected from the segments 342 of the turning drum 340, the segments again pivot relatively to the periphery of the turning drum so that they have effectively a rest position with respect to the turning drum. Prior to the ejection the segments are therefore first accelerated with respect to the drum, then retarded and finally once again accelerated with respect to the drum in order to return to their original radial position. Also, for ejecting the chewing gums the segments 342 are again opened in V-shaped manner. The control of the pivot movement and the slot width of the segments is effected by the curve-roller guides 350, 354 described above.

On the conveying path 380 the chewing gums can be pushed by the entraining members 374 by a heating means 382 of known design, the wrapping material 324 of the individual chewing gums being sealed by heat and/or pressure, for example by using wax paper.

Figure 8:
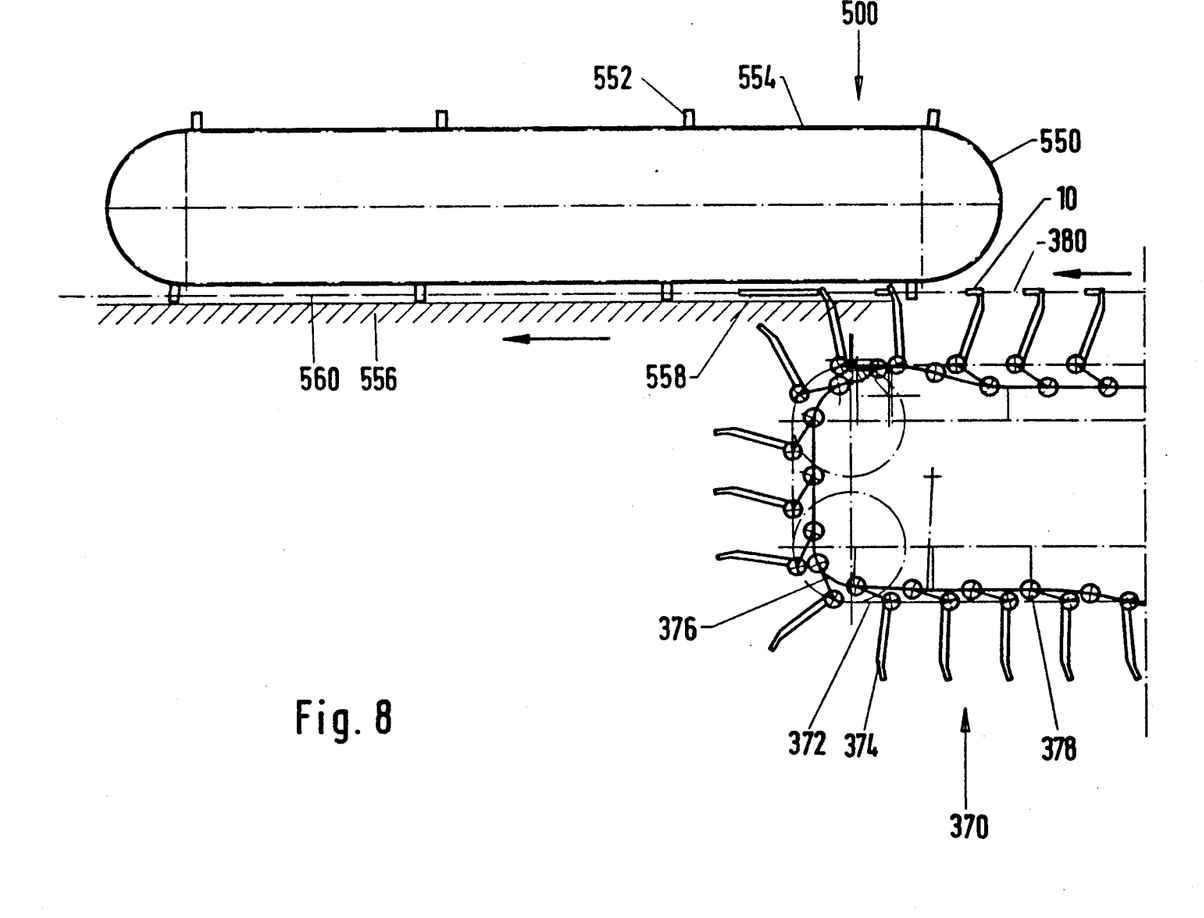
FIG. 8 is a schematic cross-section through the rear part of the wrapping region with a following second example of embodiment of a grouping means for the strip-like articles.

At the end of the transfer conveyor 370 the wrapping region 300 is followed by a grouping means for which optionally different variants 400 or 500 can be implemented (FIGS. 7, 8). Depending on the variant, these grouping means group the individual chewing gum strips to form groups of different number and arrangement. The wrapping region 300 with the wrapping conveyor 310, the folding section 330 and the transfer conveyor 370 remains the same for all the variants of the grouping means. Compared with the transfer conveyor 370 the grouping means 400 or 500 has a smaller conveying speed. Whereas the chewing gums pass through the supply region 100 and the wrapping region 300 continuously, the following grouping means 400 or 500 are movable intermittently in cycles, the introduction of the chewing gums intended for a specific group into the grouping means taking place when at least a part of the grouping conveying means is at a standstill. In each case the chewing gums are introduced by the entraining members 374 of the transfer conveyor 370 into the grouping means, possibly with acceleration, the entraining members thereupon submerging.

In the first variant of the grouping means 400 (FIG. 7), following the transfer conveyor 370 an uprighting drum 410 is provided for raising the individual wrapped chewing gum strips out of the horizontal position through 90° and supplying them on edge to a group conveyor 450 where they are combined to groups and further conveyed for packaging. The group conveyor 450 may be an upper runner 454 with entraining members 452 mounted thereon. In the group conveyor 450 the chewing gums may for example be combined to groups of 18 chewing gums, although any other number is also possible. The packaging of the chewing gum groups at the end of the group conveyor 450 is done using known methods in packaging technology.

The uprighting drum 410 carries receivers 412 which are pivotally mounted in the peripheral direction and which take the individual chewing gums over from the entraining members 374 of the transfer conveyor 370. Analogously to the turning drum 340, the control of the pivot movement of the receivers 412 during the continuous revolution of the uprighting drum 410 is carried out in such a manner that the individual receivers have a peripheral speed substantially equal to zero for receiving a chewing gum. Thus, for controlling the pivot movement of the receiver 412 in the uprighting drum 410 curved paths 416 are again provided on which the receivers engage by means of rollers 418. The receivers 412 are thereby again accelerated or retarded with respect to the uprighting drum 410 in such a manner that the chewing gum strips are effectively inserted into the receivers 412 in a rest position of the latter, thereby ensuring reliable positioning of the chewing gum strips. After insertion of the chewing gums into the receivers 412 the entraining members 374 are dipped under the uprighting drum by means of their pivot mechanism in order to avoid a collision.

In this example of embodiment above the uprighting drum 410 the group conveyor 450 is arranged which in this case is formed specifically by an overrun chain 454. Said group conveyor runs in intermittent cycles. By the continuously running uprighting drum 410 the chewing gum strips are inserted standing on edge individually into a well formed by the upper run chain 454 and a lower guide 456 until the desired number of strips is reached. Thereafter, by the movement of the upper run chain 454 an entraining member 452 moves behind the chewing gum group 458 thus formed and separates the latter from the next group to be formed. The actual group formation therefore takes place whilst the upper run chain 454 is stationary whereas the separation of the group is effected by advancing the upper run chain through at least one package length corresponding to the number of chewing gum strips contained therein. In this manner the chewing gum group 458 is further conveyed along the conveying path 460.

In the second variant of the grouping means 500 (FIG. 8) following the transfer conveyor 370 of the wrapping region 300 only one group conveyor 550 is provided and receives the individual chewing gum strips in the horizontal position, combining them for example to groups of eight strips lying flatly one behind the other. In contrast to the first variant, no uprighting drum is necessary here. The group conveyor 550 may again be an upper run chain 554 which is arranged practically flat in the extension of the transfer conveyor 370. The chewing gum strips are therefore taken over directly lying flat. The conveying path 380 of the transfer conveyor 370 therefore merges horizontally without deflection into the conveying path 560 of the group conveyor 550.

Analogously to the first variant, the upper run chain 554 here is also intermittently driven, i.e. the grouping takes place when the upper run chain is stationary whereas the group 558 is subsequently further conveyed at least one package length by means of an entraining member 552 by advancing the upper run chain 554. Just as in the first variant, the upper run chain 554 may be followed by a collective packing machine of known design in which the individual strip groups 558 formed are further wrapped and packaged into multiple cartons.

The grouping means 400 (variant 1) can be converted without any problem to the grouping means 500 (variant 2). For this purpose, in the first variant the uprighting drum 410 between the transfer conveyor 370 and the group conveyor 450 is simply removed and thereafter the group conveyor 450 or 550 shifted to the correct position for receiving the chewing gums from the transfer conveyor 370. Thus, the group conveyors 450 and 550 of the two variants may be fundamentally identical.

We claim:

1. A method for supplying, wrapping and grouping individual flat, strip-like articles, comprising the steps of:
   (a) supplying the individual articles along two continuous paths extending parallel to one another, with the individual articles on said paths having corresponding spacings relative to one another;
   (b) thereafter continuously uniting the articles for movement along one path with mutual spacing between the individual articles;
   (c) continuously individually wrapping the articles on said one path; and
   (d) finally, on a further path, continuously combining the wrapped articles by retarding the movement of the articles to form groups of articles.

2. A method according to claim 1 wherein, before step (a), providing sheets from which the individual articles are formed, and forming individual strip-like articles by cutting the articles from the sheets.

3. A method according to claim 1 wherein, on said further path, by exchanging components, different groups of individual articles are combined and packaged.

4. A method according to claim 1 wherein the individual articles comprise chewing gum strips.

5. Apparatus for supplying, wrapping and grouping individual flat, strip-like articles comprising:
   a pair of conveying members defining parallel conveying paths with one path disposed above another path for transporting individual articles in mutually spaced relationship relative to one another;
   means for merging the individual articles from said pair of conveying paths onto a conveyor defining a single conveying path; and
   a transfer conveyor following said merging means for receiving the articles and maintaining the articles in spaced-apart relation relative to one another.

6. Apparatus according to claim 5 wherein the flat, strip-like articles are formed from sheets, and including a strip cutting device having a cutter cylinder for forming discrete adjacent strips, a distributing guide for distributing the discrete strips to said pair of conveying members for conveying the articles along the two vertically spaced conveying paths.

7. Apparatus according to claim 5 wherein said two conveyor members comprise two chain transport systems, respectively, arranged parallel to and adjacent one another and having corresponding conveying directions for transporting the articles in the same direction, said chain transport systems including entraining members for engagement with the articles along said parallel conveying paths, and switch points for merging the individual articles conveyed along said parallel paths.

8. Apparatus according to claim 5 wherein said two conveyor members comprise a first chain transport system and a second chain transport system arranged below said first chain transport system, said chain transport systems including entraining members for engagement with the articles along said parallel conveying paths and which chain transport systems having revolving directions opposite to one another and corresponding conveying directions along the conveying paths for conveying the articles, and said merging means including intermediate wheels having pockets for receiving individual articles.

9. Apparatus according to claim 5 wherein said transfer conveyor comprises a transfer wheel having receiving pockets for receiving the individual articles.

10. Apparatus according to claim 5 wherein said transfer conveyor is followed by a wrapping conveyor for individually wrapping the articles.

11. Apparatus according to claim 10 wherein said wrapping conveyor includes a feed means for wrapping material for the individual articles, and a folding section following said wrapping material feed means for folding the wrapping material.

12. Apparatus according to claim 11 wherein said folding section includes folding members and a turning drum having slots for receiving the individual articles and their wrapping material.

13. Apparatus according to claim 11 including a second transfer conveyor following said folding section, said transfer conveyor including a means for sealing the wrapping material of the individual articles.

14. Apparatus according to claim 13 including following the transfer conveyor, further conveying means having a reduced conveying speed for combining the individual articles into article groups.

15. Apparatus according to claim 12 wherein said turning drum carries segments pivotally mounted on the drum and having slots for receiving the individual articles, and means for controlling the pivotal movement of said segments during turning of said drum such that each individual segment has a peripheral speed substantially equal to zero for receiving and ejecting an article.

16. Apparatus according to claim 14 wherein said segments include means for changing the slot width in the peripheral direction of the turning drum and means for controlling the slot width during revolution of said drum.

17. Apparatus according to claim 15 wherein said control means includes rollers carried by said segments and a structure defining respective curved paths for engagement by said rollers.

18. Apparatus according to claim 12 wherein said folding section extends about at least that peripheral portion of said turning drum on which the latter conveys the articles.

19. Apparatus according to claim 10 wherein said wrapping conveyor includes individual entraining members pivotally mounted thereon and means for controlling said entraining members to engage behind the individual articles to introduce the articles into a turning drum and subsequently said entraining members withdraw downwardly from said turning drum.

20. Apparatus according to claim 13 wherein said second transfer conveyor carries individually pivotally mounted second entraining members and means for controlling said second entraining members to remove the articles from a turning drum by engaging behind the articles and guiding the articles to a following further conveying means, and subsequently the entraining members withdraw downwardly.

21. Apparatus according to claim 13 wherein said wrapping conveyor and said second transfer conveyor are arranged in a straight line one behind the other and are mechanically separate from each other, and means for individually driving said wrapping conveyor and said second transfer conveyor.

22. Apparatus according to claim 21 wherein said wrapping conveyor and said second transfer conveyor include chain transport systems.

23. Apparatus according to claim 19 including means for controlling the pivotal movement of said entraining members including rollers carried by said segments and a structure defining respective curved paths for engagement by said rollers.

24. Apparatus according to claim 13 including following the second transfer conveyor, an uprighting drum for raising the individual flat articles and supplying them on edge to a group conveyor for combination of the articles into groups.

25. Apparatus according to claim 24 wherein said uprighting drum carries receivers mounted for pivotal movement in the peripheral direction for receiving the individual articles, and means for controlling the pivotal movement of said receivers during continuous drum rotation so that the individual receivers have a peripheral velocity substantially equal to zero for receiving an article.

26. Apparatus according to claim 25 wherein said controlling means includes structure defining curved paths, and rollers carried by said drum engaging said curved paths.

27. Apparatus according to claim 14 including a group conveyor following the transfer conveyor for receiving the individual articles in a horizontal position for combination into groups.

28. Apparatus according to claim 14 wherein said further conveying means is movable intermittently in cycles, the introduction of the articles for a respective group occurring when the further conveying means is at a standstill.

* * * * *